United States Patent
Parry

(10) Patent No.: US 7,934,727 B1
(45) Date of Patent: May 3, 2011

(54) WHEELBARROW THRUSTER AND STABILIZER

(75) Inventor: Dale D. Parry, Las Vegas, NV (US)

(73) Assignee: Dale D. Parry, Las Vegas, NV (US)

( * ) Notice: Subject to any disclaimer, the term of this patent is extended or adjusted under 35 U.S.C. 154(b) by 137 days.

(21) Appl. No.: 12/283,983

(22) Filed: Sep. 16, 2008

(51) Int. Cl.
*B62B 5/00* (2006.01)

(52) U.S. Cl. ............ 280/47.18; 280/47.31; 280/47.315; 16/422

(58) Field of Classification Search .................... 16/420, 16/900, 111, 422, 426, 427, 429, 430, 419; 280/1.5, 47.17–47.18, 47.32, 47.33, 47.41, 280/655; 411/384, 550, 551; 298/3
See application file for complete search history.

(56) References Cited

U.S. PATENT DOCUMENTS

| | | | |
|---|---|---|---|
| 4,951,956 A * | 8/1990 | Vittone | 280/47.31 |
| 5,261,690 A * | 11/1993 | Kluber | 280/648 |
| 5,346,232 A | 9/1994 | Bushon | |
| 5,769,431 A * | 6/1998 | Cordova | 280/1.5 |
| 5,810,375 A | 9/1998 | Hoffarth et al. | |
| 6,098,993 A * | 8/2000 | Bellinson | 280/1.5 |
| 6,349,949 B1 * | 2/2002 | Gorringe | 280/1.5 |
| 6,550,104 B2 * | 4/2003 | Cacciacarne | 16/426 |
| 6,883,845 B2 * | 4/2005 | Douziech | 294/58 |
| 6,935,643 B1 * | 8/2005 | Purpuro | 280/47.32 |
| 7,195,248 B1 | 3/2007 | Miesch | |
| 7,322,584 B1 * | 1/2008 | Parker | 280/47.131 |
| 7,464,441 B2 * | 12/2008 | Peach | 16/430 |
| 7,549,648 B2 * | 6/2009 | Girard et al. | 280/1.5 |
| 2005/0211740 A1 | 9/2005 | Sekulic | |
| 2007/0187910 A1 | 8/2007 | Adams | |

* cited by examiner

*Primary Examiner* — Jeffrey J Restifo
*Assistant Examiner* — Erez Gurari
(74) *Attorney, Agent, or Firm* — SilverSky Group, LLC

(57) ABSTRACT

A waist high horizontal crossbar that uses a user's abdominal muscles to provide a strong forward thrust that alleviates unnecessary strain on the user's arms and shoulders. Incorporated in the horizontal bar are two vertical bars, right and left, that provide effective stabilization of the wheelbarrow. When a user uses their forearms against the vertical bars, this assists in preventing sideways tipping which is a common problem with a wheelbarrow.

17 Claims, 8 Drawing Sheets

Fig. 5
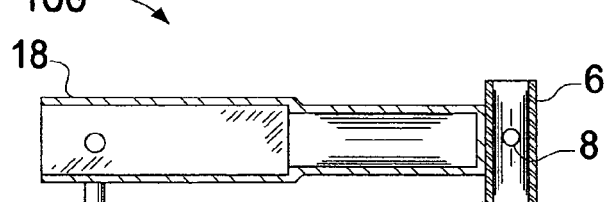
Fig. 6
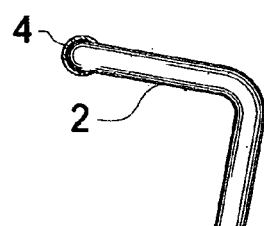
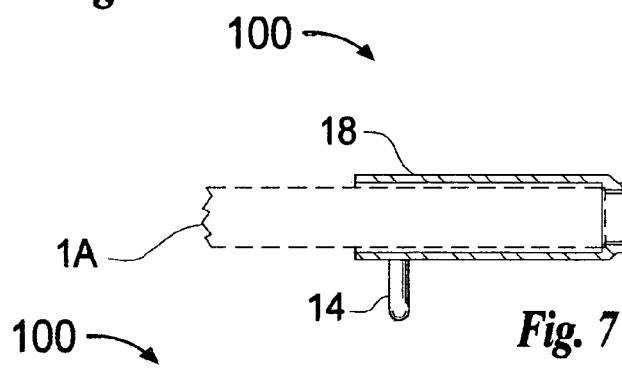
Fig. 7
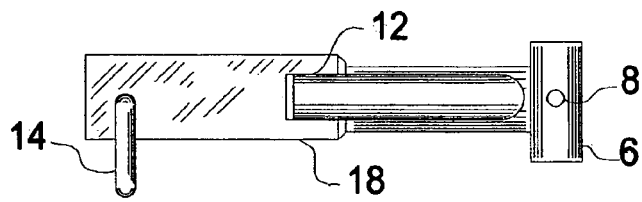
Fig. 8
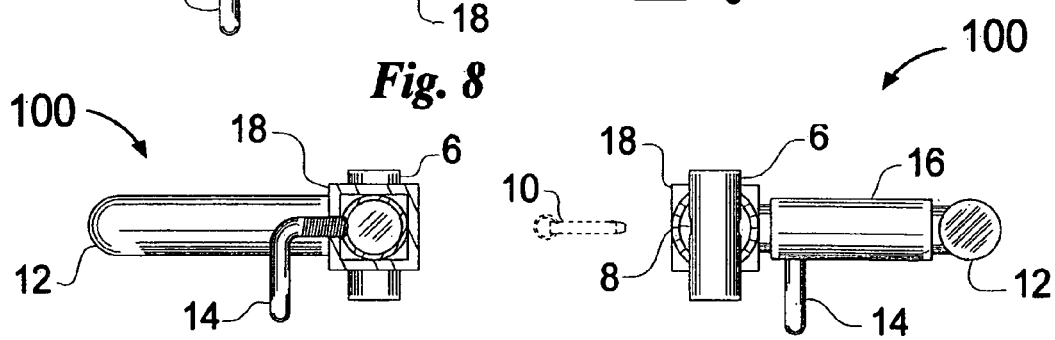
Fig. 9   Fig. 10

US 7,934,727 B1

WHEELBARROW THRUSTER AND STABILIZER

FIELD OF THE INVENTION

The purpose of the invention is to provide a more powerful forward thrust and lateral stabilization to a conventional wheelbarrow and to a round handled wheelbarrow.

The invention comprises a waist high horizontal crossbar that uses a user's abdominal muscles to provide a strong forward thrust that alleviates unnecessary strain on the user's arms and shoulders. Incorporated in the horizontal bar are two vertical bars, right and left, that provide effective stabilization of the wheelbarrow. When a user uses his or her forearms against the vertical bars, this assists in preventing sideways tipping which is a common problem with wheelbarrows.

Existing products on the market do not include such a thrusting bar or a stabilizing bar as suggested by the invention. The primary moving force in a conventional wheelbarrow is exerted by a user's arms and shoulders and provides no way to stabilize the wheelbarrow in the left and right directions.

A conventional and round handled wheelbarrow also demands control and strength when dumping.

The invention comprises swiveling sleeves which provide a more stable, all-in-one continuous movement when dumping, therefore dumping is easily and safely controlled when being emptied.

The invention considerably reduces strain on the user's back, shoulders and arms.

With the invention, as there is more control than a conventional or round handled wheelbarrow, it allows more to be placed in a wheelbarrow which will speed up work time.

DESCRIPTION OF THE PRIOR ART

In the prior art U.S. Pat. No. 5,346,232 (BUSHON, RICHARD J) discloses a wheelbarrow power strap. A cross member is mounted to and extends between the handle shafts of a wheelbarrow at a location intermediate the material carrying bin of the wheelbarrow and the handles which are grasped by the laborer whereby the laborer grasping the handles can place the front of his thigh against the cross member to exert a three on the wheelbarrow to initiate lifting and forward movement of the wheelbarrow using his thigh muscles to reduce any strain on the arms, shoulders and/or back of the laborer. The cross member is a flexible strap which has mounting assemblies that is adjustable in length to permit the cross member to be mounted on wheelbarrows having differing spacing between the handle shafts.

U.S. Pat. No. 5,810,375 (HOFFARTH et al) discloses wheelbarrow handles, a wheelbarrow handle including a closed loop hand-grip. The hand-grip can be an integral portion of the handle, or retrofit to existing wheelbarrow handles by a mounting mechanism all designed to control front dumping.

U.S. Pat. No. 6,550,104 (CACCIACARNE) discloses a wheelbarrow handle adapter. The wheelbarrow handle adapter has an adapter handle with a proximal end and a distal end with an approximate right angle bend there between. The adapter handle at the proximal end is attachable to a wheelbarrow handle. In one configuration a sleeve is inserted onto the end of the wheelbarrow handle and a handle bolt is inserted through the adapter handle intermediate the distal end and the proximal end to threadably engage the sleeve. In an alternate configuration the adapter handle having a tubular opening at the distal end is curved sufficiently at the distal end to insert the tubular opening onto the end of the wheelbarrow handle.

U.S. Pat. No. 7,195,248 (MIESCH, GREGG B) discloses a wheelbarrow attachment for the back of the bucket of a wheelbarrow. A wheelbarrow attachment for a typical wheelbarrow, the attachment removably fitting over the lip and bucket of the back of the wheelbarrow and therefrom extending upward and backward from the rear of the bucket. The u-channels fitting the bucket are connectively braced. Inner uprights attach to the u-channels and are adjustably fitted for height, and fore and aft adjustment of a padded cress plate connecting the inner uprights. A user braces and pushes with his/her body, offering greater force for propelling the wheelbarrow and greater stability in handling a loaded wheelbarrow.

US20050211740 (SEKULIC, ZARON O) discloses apparatus for lifting, controlling and maneuvering a wheelbarrow. An apparatus for reducing the load on a wheelbarrow user's arms and assisting the user to lift and maneuver the wheelbarrow includes a pad residing on the user's shoulders, a strap passing through the and secured to wheelbarrow's handles and means for adjusting the length of the strap between the two wheelbarrow handles.

US20070187910 (ADAMS, JACQUELINE) discloses a pusher for a stroller. A belt or similar wearable device that is worn about the midsection or waist of the user. A rod is connected to a wheeled vehicle. The rod is mounted to the belt by mounting that permits the rod to pivot both horizontally and vertically, and otherwise, relative to the belt.

SUMMARY OF THE INVENTION

The first embodiment of the invention the apparatus is intended to be incorporated into the construction of a metal or wooden handled wheelbarrow. In broad terms a bar (typical size being about 1 inch) is bent or fashioned to act as a thruster and a stabilizer. The bar extends vertically (typically about 10 inches) from the anterior end of the wheelbarrow handle, the bar is then bent at approximately 90 degrees towards the front of the wheelbarrow (typically about 6 to 7 inches), extends outwardly and then bent again at another approximate 90 degrees angle to the right or the left dependent of the side of the wheelbarrow, running parallel with the plane of the ground (typically extending approximately 22 inches to the opposite side). Each side is a mirror of the other. In use, a user's forearms will push against the sides of the bar to prevent tipping right to left. The user's stomach muscles will be used to push against the front of the bar to help propel the wheelbarrow forward when loaded thereby reducing stress to the shoulders and arms as with a conventional wheelbarrow.

In addition to the bar, on each side, is a small outrigger handle that is affixed, such as by welding, to the outside of the handle acting as a stabilizer. A long section of tubing (typically around 6 inches with an outside diameter of three quarters of an inch) is welded at an angle (typically 15 degrees) and parallel to the ground plane, then a section of tubing (typically of 5¾ inches section) is slipped over the welded piece of tubing, this tubing is allowed to spin freely. Welded at an angle (approximately 75 degrees) and parallel to the wheelbarrow handle towards the front of the wheelbarrow is another piece of tubing. To that end of that tubing another piece of tubing is welded (at approximately 15 degrees) and the other end is welded to the wheelbarrow handle. These handles act to stabilize the wheelbarrow and to facilitate dumping.

In a second embodiment of the invention, the apparatus is designed to fit over the wooden handles and shafts of a wheelbarrow. It consists of a 6 inch section of typically 1½ inch inner diameter round metal tubing welded to the end of a 7 inch section of typically 1½ inch inner diameter square metal tubing that slides over the handles of the wheelbarrow and is then fastened with a clamp welded to the leading edge of the square tubing. Welded to the other end of each of the round tubing is a typically 3 inch vertical ¾ inch inner diameter tube that receives a ¾ inch outer diameter bar. The bar is bent or fashioned to act as a thruster and a stabilizer. It is then bolted into the respective 3 inch tubes of the ends of the right and left side handles. The bar typically has 7 inches of threaded rod at the bottom of each side that fits into the 3 inch tubes. A nut rests at the top and bottom of the tube thereby allowing the rod to be tightened securely and to be raised or lowered. From the top of the 3 inch tube and the end of the threading, on each side of the wheelbarrow, the bar extends typically 10 inches vertically then is bent down to approximately a 90 degree angle toward the front of the wheelbarrow, extending typically about 6 to 7 inches at which point the bar in bent at another 90 degree to the right or left depending on the side, running parallel with the plane of the ground, and extends typically 22 inches to the opposite side. Each side is a mirror of the other if divided in the middle between the handles.

In a third embodiment of the invention, the apparatus is designed to fit over the wooden handles and shafts of a wheelbarrow. It consists of a 6 inch section of typically 1½ inch inner diameter round metal tubing welded to the end of a 7 inch section of typically 1½ inch inner diameter square metal tubing that slides over the handles of the wheelbarrow and is then fastened with a clamp welded to the leading edge of the square tubing. Welded to the other end of each of the round tubing is a typically 3 inch vertical 1 inch inner diameter tube that receives a 1 inch outer diameter bar. The bar is bent or fashioned to act as a thruster and a stabilizer. It is then bolted into the respective 3 inch tubes of the ends of the right and left side handles. The bar typically has 7 inches of threaded rod at the bottom of each side that fits into the 3 inch tubes. A nut rests at the top and bottom of the tube thereby allowing the rod to be tightened securely and to be raised or lowered. From the top of the 3 inch tube and the end of the threading, on each side of the wheelbarrow, the bar extends typically 10 inches vertically then is bent down to approximately a 90 degree angle toward the front of the wheelbarrow, extending typically about 6 to 7 inches at which point the bar in bent at another 90 degree to the right or left depending on the side, running parallel with the plane of the ground, and extends typically 22 inches to the opposite side. Each side is a mirror of the other if divided in the middle between the handles.

In addition, on each side, there is a small outrigger handle that is welded to the square and round tubing. A typically 6 inch long section of tubing with an outer diameter of ¾ of an inch is welded at a 90 degree angle and parallel to the ground to the outside of the 3 inch tube, then a typically 5¾ inch section of tubing with a ¾ inch inner diameter is slipped over the welded piece of tubing, left to spin freely around the ¾ inch tube. Welded at a 90 degree angle and parallel to the wheelbarrow handle toward the front of the wheelbarrow, to the initial 6 inch piece of tubing, is another 6 inch piece of tubing with an outer diameter of one inch. To the end of that tubing another approximately 7 inch piece of 1 inch outer diameter tubing is welded at an approximate 15 degree angle and then the other end of the 7 inch piece is welded to the square metal section.

In a fourth embodiment of the invention, the apparatus is designed to fit over the metal shafts of a wheelbarrow. It consists of a 12 inch section of typically 1½ inch inner diameter round metal tubing that slides over the handles of the wheelbarrow and is than fastened with a clamp welded to the leading edge of the tubing. Welded to the other end of each of the round tubing is a typically 3 inch vertical ¾ inch inner diameter tube that receives a ¾ inch outer threaded bar. The bar is bent or fashioned to act as a thruster and a stabilizer. It is then bolted into the respective 3 inch tubes of the ends of the right and left side handles. The bar typically has 7 inches of threaded rod at the bottom of each side that fits into the 3 inch tubes. A nut rests at the top and bottom of the tube thereby allowing the rod to be tightened securely and to be raised or lowered. From the top of the 3 inch tube and the end of the threading, on each side of the wheelbarrow, the bar extends typically 10 inches vertically then is bent down to approximately a 90 degree angle toward the front of the wheelbarrow, extending typically about 6 to 7 inches at which point the bar in bent at another 90 degree to the right or left depending on the side, running parallel with the plane of the ground, and extends typically 22 inches to the opposite side. Each side is a mirror of the other if divided in the middle between the handles. These handles act to stabilize the wheelbarrow and to facilitate dumping.

In a fifth embodiment of the invention the device is essentially the same as the other embodiments except that the thruster bar across the leading edge of the device that extends to each side of the wheelbarrow is replaced with a strong strap or belt referred to as a thruster strap. The strap or belt wraps around the vertical sides of the device.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A complete understanding of the present invention may be obtained by reference to the accompanying drawings, when considered in conjunction with the subsequent, detailed description, in which:

FIG. 5 shows a side view of the lifting end of the current invention's handle

FIG. 6 shows a side cut open view of the current invention's handle

FIG. 7 shows a cut open side view of the current invention's handle showing the thruster bar FIG. 8 shows a side view of the current invention with thruster bar FIG. 9 shows a front view of the locking mechanism FIG. 10 shows a rear view of FIG. 9

For purposes of clarity and brevity, like elements and components will bear the same designations and numbering throughout the figures.

DETAILED DESCRIPTION

Figure 1:
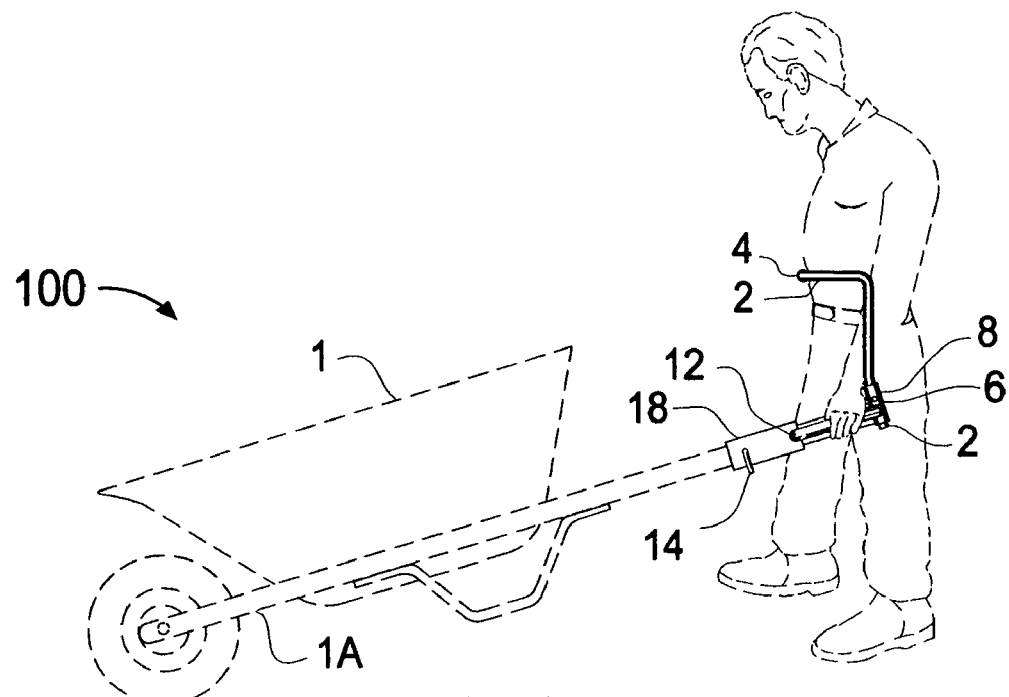
FIG. 1 shows a side view of a wheelbarrow with preferred embodiment

Throughout, reference numeral 100 is shown to designate the invention attached to a conventional wheelbarrow having round-to-square handles while reference numeral 200 is shown to designate the invention attached to round wheelbarrow handles.

FIG. 1 shows a side view of a wheelbarrow 1. The wheelbarrow 1 is attached to a handle lifting end 1A. The novelty and inventive step in this patent is the use of a thruster bar 2 and turnbuckle 4 which rests against a user's abdominal muscles to provide a strong forward thrust that alleviates unnecessary strain on the user's arms and shoulders. The thruster bar 2 is parallel to the back of the wheelbarrow and also preferably the leading and anterior edges of the outrigger handles 12 should be parallel to the back of the wheelbarrow. The turnbuckle 4 is an adjustable bar which accommodates operator size. A socket 6 is provided which accommodates the thruster bar 2 and pinholes 8 are used for adjusting the height of the thruster bar 2. When in use an outrigger handle 12 is provided on both sides of the invention onto which a user will grip. This is explained more clearly with reference to FIG. 2. In the embodiment shown in FIG. 1 a square-to-round tubing is provided to allow attachment of the invention to the handle lifting end 1A which in the figure is of square section and a set-screw lock 14 is used to hold the square-to-round tubing in place.

Figure 2:
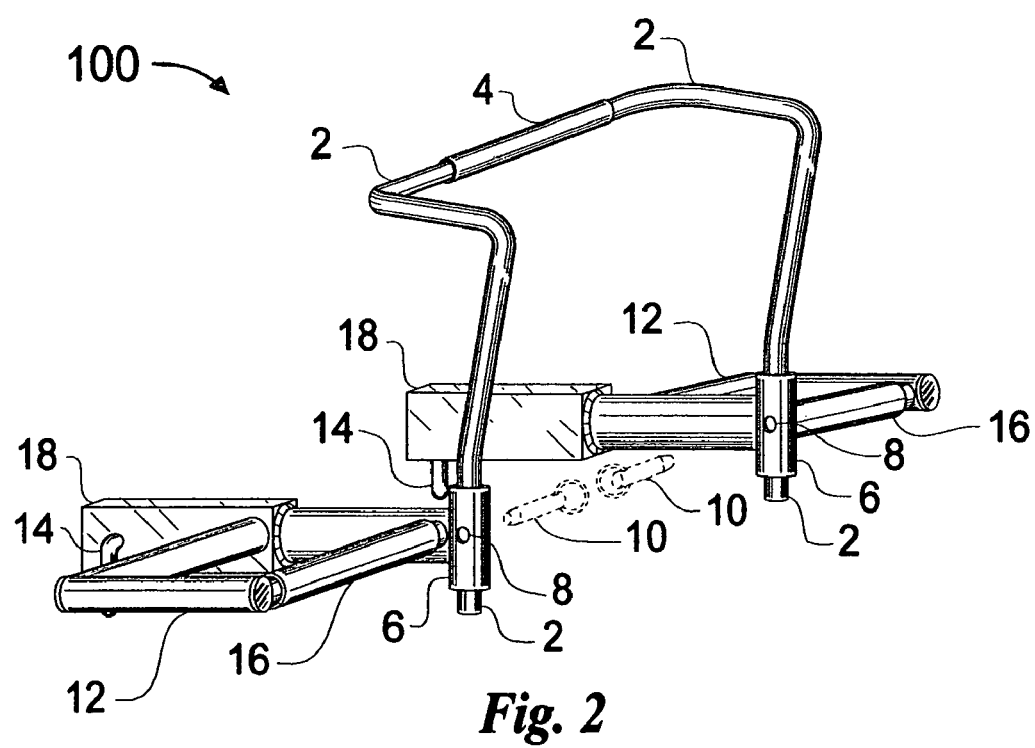
FIG. 2 shows an isometric view of the current invention
Figure 3:
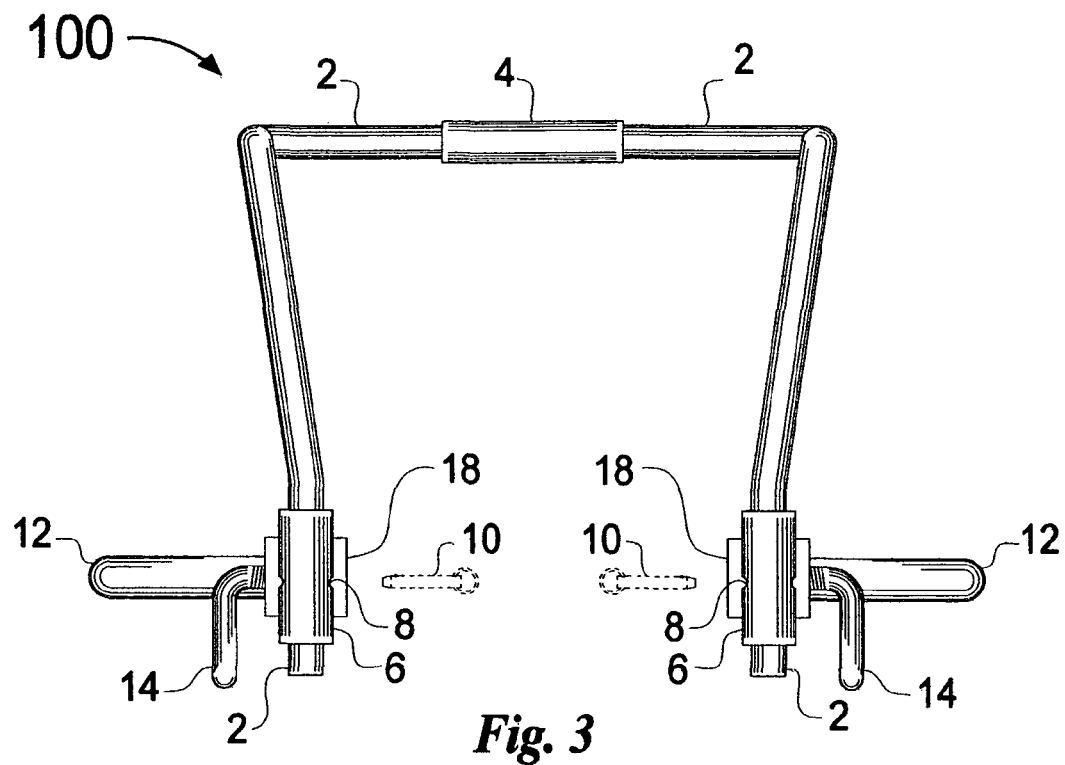
FIG. 3 shows a rear view of the current invention

FIG. 2 shows an isometric view of the current invention. At the upper part of the invention is a turnbuckle 4 which is adjustable in size to allow for different size operators. At either side of turnbuckle 4 is the thruster bar 2 which extends outwardly from the turnbuckle 4, inwardly and then downwardly with respect to a user's body. At the lower end of the thruster bar 2 is socket 6. It can be seen from the figures that the left and right sides of the device are identical and identical numerals are used in this figure. A pin 10 is slid through the socket 6 and through the pinhole 8 to adjust the height of the device. An outrigger handle 12 is provided and a swivel sleeve 16 to which a user uses to grip for ease of hand rotation. So that the device can be attached to a conventional wheelbarrow, a square-to-round tubing is provided and is affixed by a set-screw lock 14. FIG. 3 shows a rear view of the current invention shown in FIG. 2.

Figure 4:
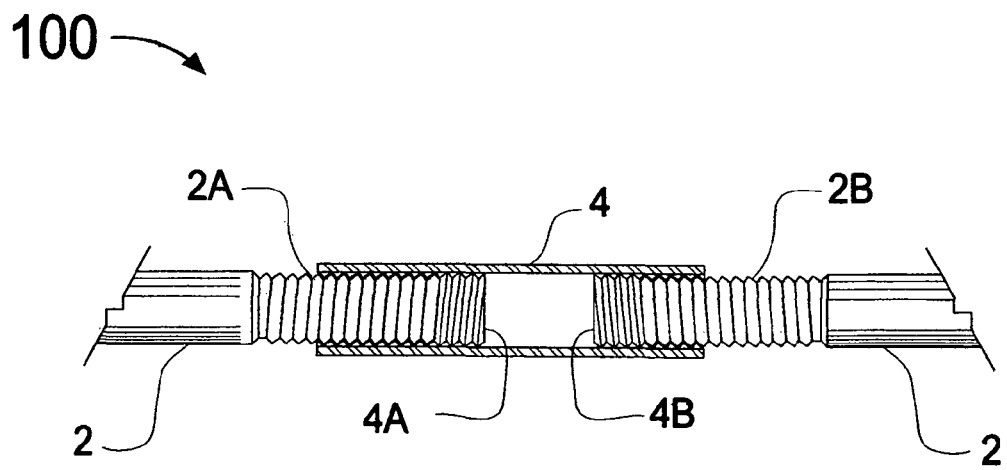
FIG. 4 shows a side view of the turnbuckle adjuster and thruster bar

FIG. 4 shows a side view of the turnbuckle adjuster and thruster bar. The turnbuckle 4 is attached to the thruster bar 2 via external threads 2A and 2B which thread into internal (directional) threads 4A and 4B.

FIG. 5 shows a side view of the lifting end of the current invention's handle 1A such as that shown in FIG. 1.

FIG. 6 shows a side cut open view of the current invention's handle. As previously noted the socket 6 has a pinhole 8 to adjust the height of the thruster bar. Square-to-round tubing 18 is provided to allow attachment to a conventional wheelbarrow which is locked in place via a set-screw lock 14.

FIG. 7 shows a cut open side view of the current invention's handle showing the thruster bar 2 and the turnbuckle 4 connected to the handle shown in FIG. 6 and also shows a view of the square handle lifting end and how it attaches to the square-to-round tubing 18.

FIG. 8 shows a side view of the current invention with thruster bar as in FIG. 6 but not of a cut open view. As the view is not cut open the outrigger handle 12 is shown.

FIG. 9 shows a front view of the locking mechanism and how the set-screw lock 14 passes through the square-to-round tubing and the socket 6. The outrigger handle is shown at 12.

FIG. 10 shows a rear view of FIG. 9 and also shows a pin 10 which slides into the socket 6 via pinhole 8 to adjust the height of the thruster bar.

Figure 11:
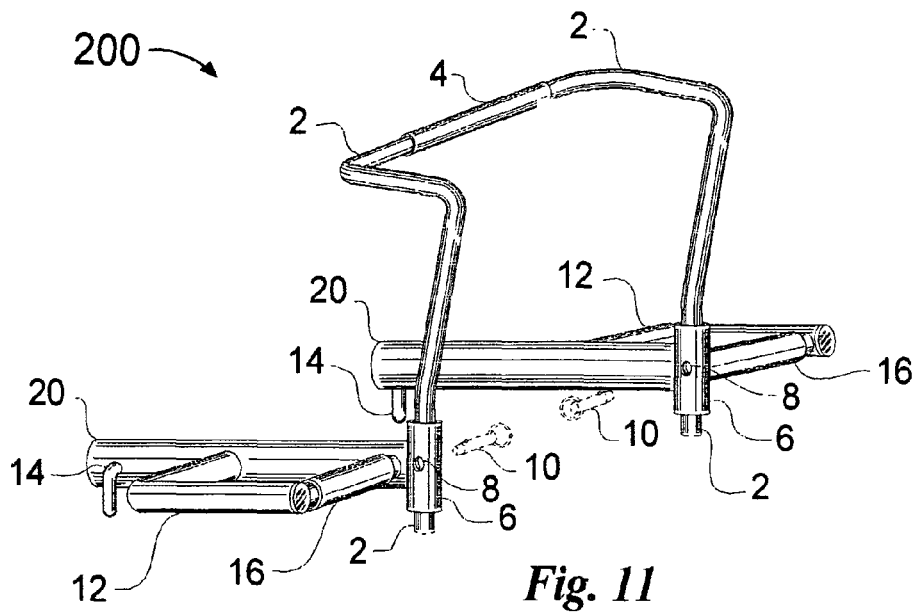
FIG. 11 shows an isometric view of the invention for a round wheelbarrow handle

FIG. 11 shows an isometric view of the invention for a round wheelbarrow handle. The invention is the same as that shown in FIG. 2 except that the square-to-round tubing is replaced with round tubing 20 so that the invention slips straight onto the round handle of the wheelbarrow and set in place with the set-screw lock 14.

Figure 12:
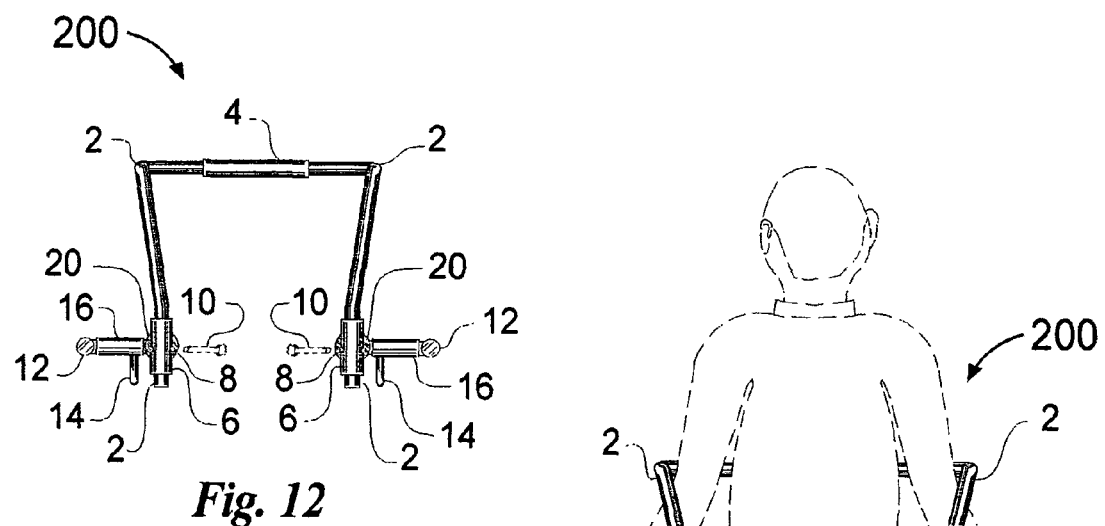
FIG. 12 shows a rear view of the invention

FIG. 12 shows a rear view of the invention shown in FIG. 11 again showing the round tubing 20.

Figure 13:
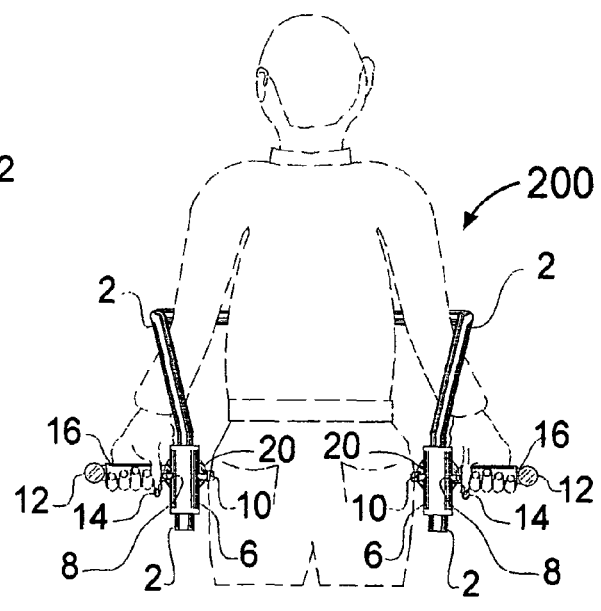
FIG. 13 shows a rear view of the current invention with user position

FIG. 13 shows a rear view of the current invention with user position and in this embodiment using a round handled wheelbarrow 200. This figure is used to exemplify the relationship of a user in position and how the invention is positioned and gripped.

Figure 14:
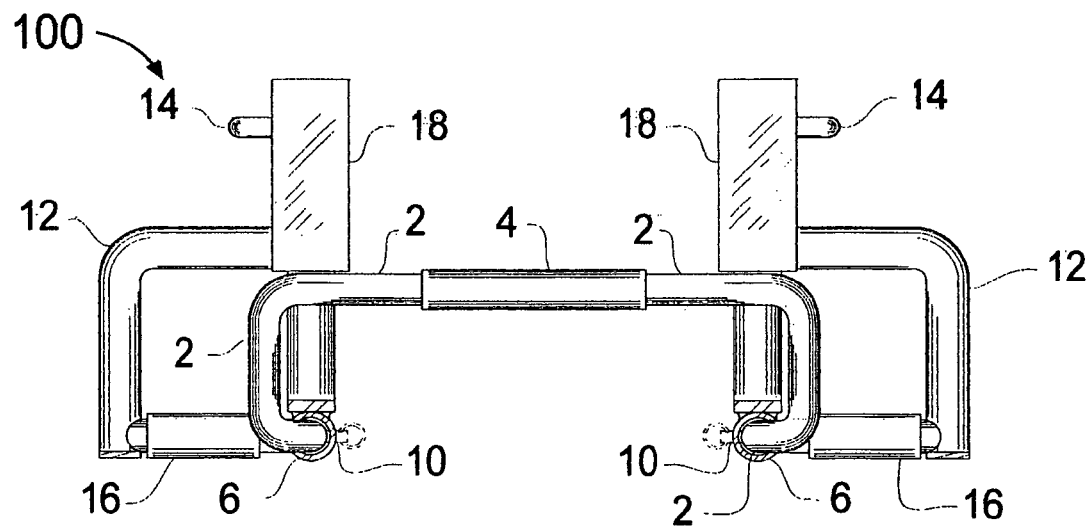
FIG. 14 shows a top view of the anti-tipping mechanism of a wheelbarrow under a heavy load

FIG. 14 shows a top view of the anti-tipping mechanism of a wheelbarrow for use under a heavy load. In use, a user's forearms will push against the sides of the bar 2 to prevent tipping right to left. The user's stomach muscles will be used to push against the front of the bar 2 to help propel the wheelbarrow forward when loaded thereby reducing stress to the shoulders and arms as with a conventional wheelbarrow.

Figure 15:
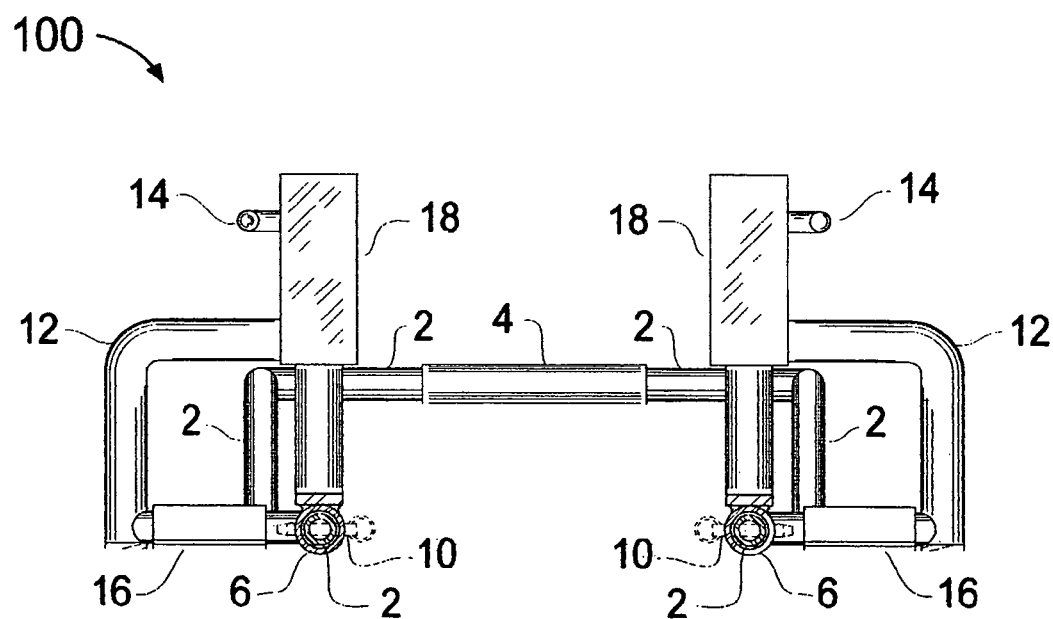
FIG. 15 shows a bottom view of the thruster bar, outrigger handles, securing pins and swivel sleeve

FIG. 15 shows a bottom view of the thruster bar 2, outrigger handles 12, securing pins 10 and swivel sleeve 16.

Figure 16:
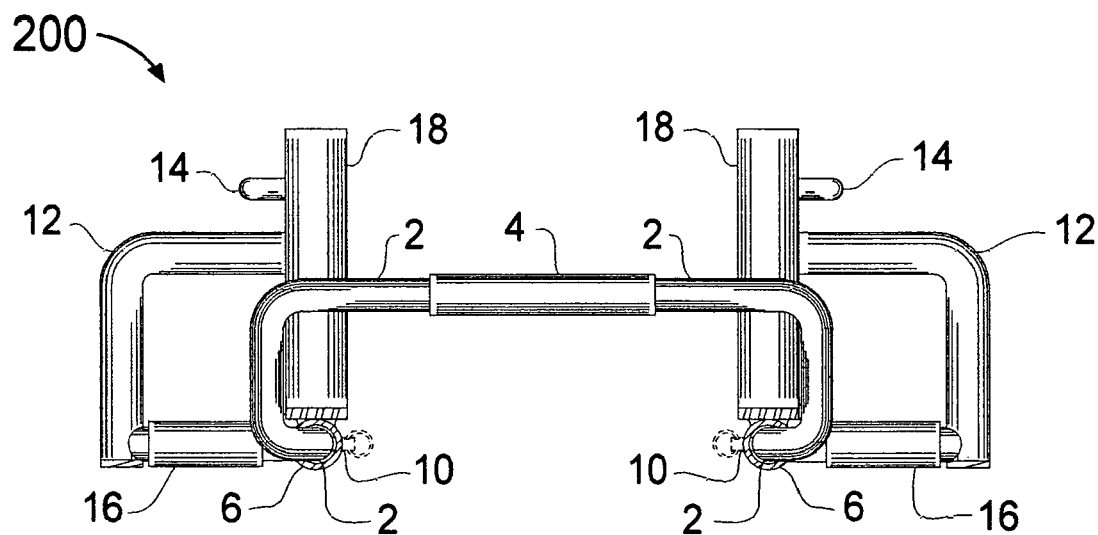
FIG. 16 shows a bottom view of the square tubing, outrigger handles, swivel sleeve, pin socket and pin
Figure 17:
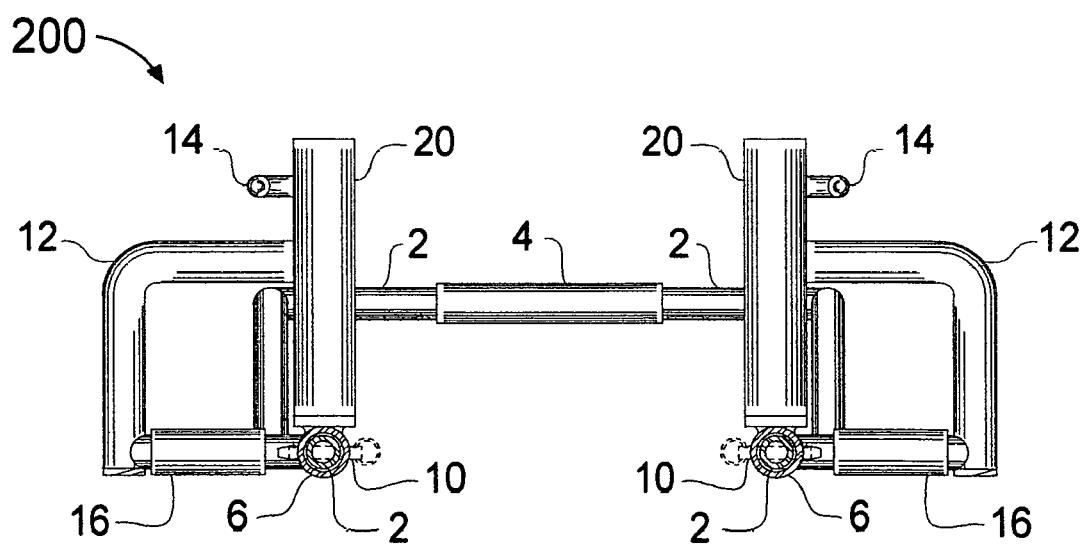
FIG. 17 shows a top view of FIG. 16

FIG. 16 shows a bottom view of the square-to-round tubing 18, outrigger handles 12, swivel sleeve 16, pin socket 6 and pin 10. FIG. 17 shows a top view of FIG. 16.

Figure 18:
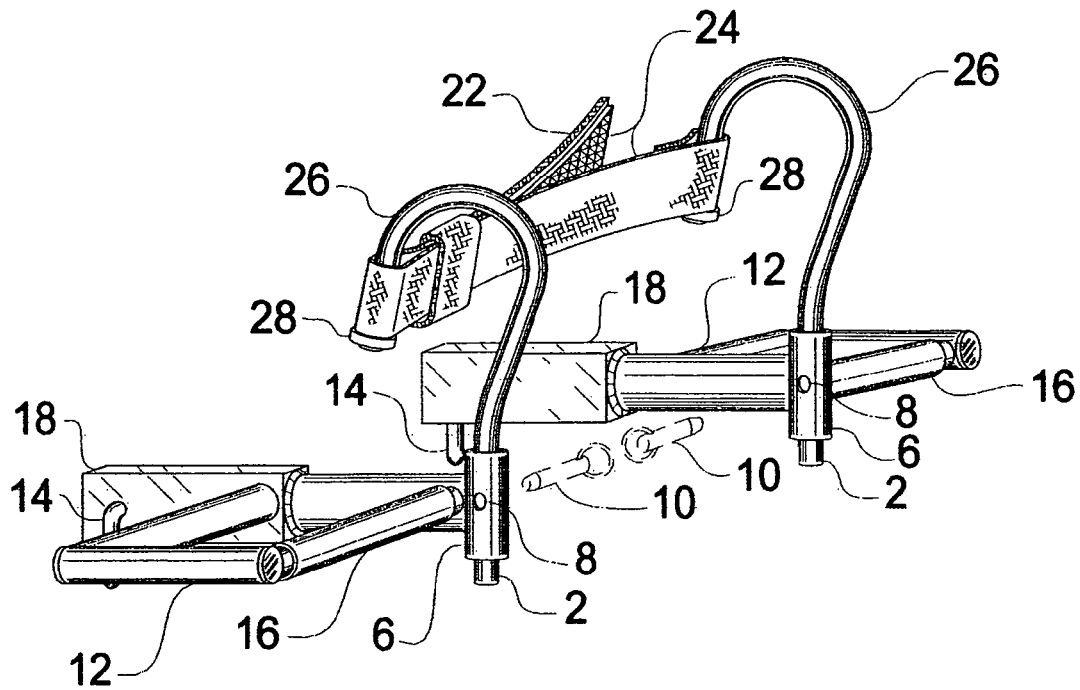
FIG. 18 shows a rear isometric view of the thruster strap, strap retaining bars, outrigger handles, pinhole socket, hole and swivel sleeve
Figure 19:
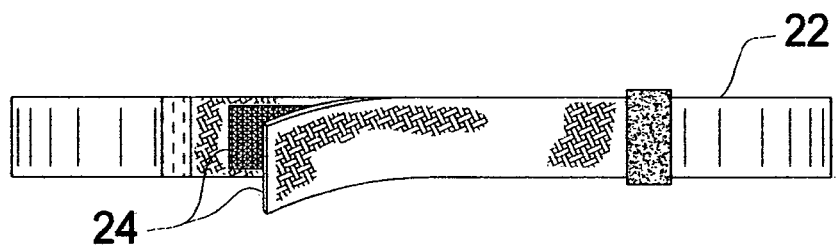
FIG. 19 shows a front view of the thruster strap and fastener
Figure 20:
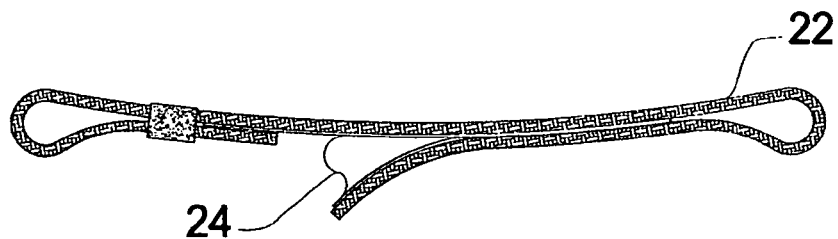
FIG. 20 shows a top view of FIG. 19

In another embodiment the turnbuckle 4 (shown in previous figures) can be replaced with a thruster strap 22 and is shown in FIG. 18. This figure shows a rear isometric view of the thruster strap 22, strap retaining bars 26, outrigger handles 12, pinhole 8, and swivel sleeve 16 which forms a secondary outer handle to the existing 12 bar under it. A strap retaining collar 28 is used to prevent the thruster strap 22 from sliding off and a fastener 24 is used to hold the strap 22 secure. FIG. 19 shows a front view of the thruster strap 22 and fastener 24. FIG. 20 shows a top view of FIG. 19.

Figure 21:
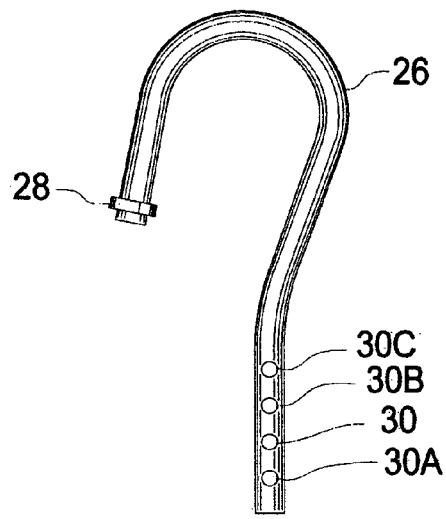
FIG. 21 shows a side view of the strap retaining bar, collar (which prevents the strap from slipping off) and elevation pinholes
Figure 23:
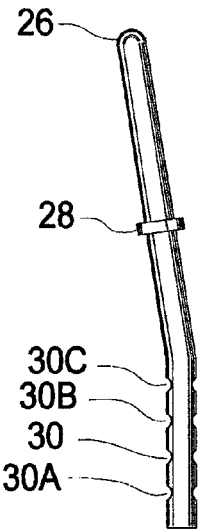
FIG. 23 shows a front view of FIG. 21
Figure 24:
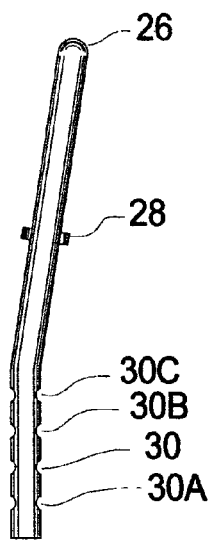
FIG. 24 shows a back view of FIG. 21

FIG. 21 shows a side view of the strap retaining bar 26, collar 28 which prevents the strap from slipping off and elevation pinholes 30, 30A, 30B and 30C through which the pin 10 (shown in other figures) is slid through to provide adjustment FIG. 23 shows a front view of FIG. 21. FIG. 24 shows a back view of FIG. 21.

Figure 22:
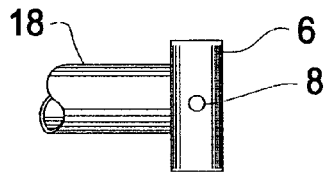
FIG. 22 shows a side view of the socket assembly

FIG. 22 shows a side view of the socket assembly 6 that is attached to the square-to-round tubing 18 and has the pinhole 8 for adjusting the height of the thruster bar.

Figure 25:
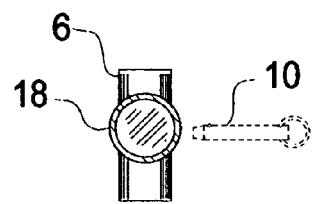
FIG. 25 shows a front view of the socket, pin and pinhole

FIG. 25 shows a front view of the socket 6, pin 10 and square-to-round tubing 18.

Figure 26:
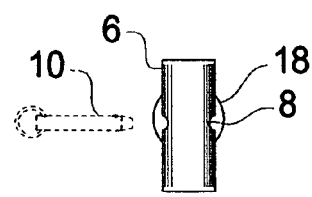
FIG. 26 shows a front view of the round tubing

FIG. 26 shows a front view of the round tubing 18, and the pinholes 8, pin 10 and socket 6.

Figure 27:
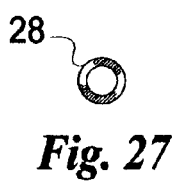
FIG. 27 shows a front view of the strap retaining collar

FIG. 27 shows a front view of the strap retaining collar 28 which is used to prevent the thruster strap 22 from sliding off and shown in place in FIG. 21 for example.

It will be apparent to those skilled in the art that various modifications and variations can be made to the structure of the present invention without departing from the scope or the spirit of the invention. In view of the foregoing, it is intended that the present invention cover modifications and variations of this invention provided they fall within the scope of the following claims and their equivalents.

What is claimed:

1. An apparatus for assisting forward thrust and lateral stabilization to a wheelbarrow having a first handle and a second handle, the apparatus comprising:
    a thruster bar having a first substantially horizontal member substantially perpendicular to a forward direction of the wheelbarrow and extending above the wheelbarrow, a first end of the first substantially horizontal member connected to a second substantially horizontal member substantially perpendicular to the first substantially horizontal member, a second end of the first substantially horizontal member connected to a third substantially horizontal member substantially perpendicular to the first substantially horizontal member and substantially parallel to the second substantially horizontal member, a first substantially vertical member extending substantially vertically from the second substantially horizontal member to the first handle, and a second substantially vertical member extending substantially vertically from the third substantially horizontal member to the second handle; and
    a first tubing connector connecting the first handle to the first substantially vertical member and a second tubing connector connecting the second handle to the second substantially vertical member, the first tubing connector fitting over the first handle and the second tubing connector fitting over the second handle, wherein when the apparatus is in use, the first substantially horizontal member is placed against abdominal muscles of a user to provide a strong forward thrust that alleviates unnecessary strain on the user as the user lifts the first tubing connector and the second tubing connector, wherein the back of the user is not in contact with the thruster bar, and wherein the second substantially horizontal member, the third substantially horizontal member, the first substantially vertical member and the second substantially vertical member provide effective lateral stabilization of the wheelbarrow when forearms of the user are pressed against at least the first substantially vertical member and the second substantially vertical member to assist in preventing sideways tipping;
    wherein, the thrusting bar is selectively connectable to the first tubing connector and the second tubing connector.

2. An apparatus according to claim 1 in which the first substantially horizontal member comprises a bar and an adjuster for adjusting the distance between the first substantially vertical member and the second substantially vertical member.

3. An apparatus according to claim 1 in which the first substantially horizontal member comprises an adjustable strap comprising a fastener to allow adjustment of the adjustable strap.

4. An apparatus according to claim 2 in which the inner part of the bar is threaded to allow adjustment.

5. An apparatus according to claim 4 wherein a first upper end of the first substantially vertical members that connects with the second substantially horizontal member and a second upper end of the second substantially vertical member that connects with the third substantially horizontal member are comprised of an external thread for co-operation with the inner part of the second substantially horizontal member and the third substantially horizontal member which are threaded.

6. An apparatus according to claim 1 wherein the first tubing connector and the second tubing connector are square-to-round tubing, to allow connection of the apparatus to square handled wheelbarrows.

7. An apparatus according to claim 1 wherein the first tubing connector and the second tubing connector are round tubing to allow connection to a round handled wheelbarrow.

8. An apparatus according to claim 6 wherein a first set-screw lock is provided to lock the first tubing connector to the first handle and a second set-screw lock is provided to lock the second tubing connector to the second handle.

9. An apparatus according to claim 1 wherein the first tubing connector includes a first apparatus handle extending substantially perpendicularly to the first tubing connector and comprises three tubular sections at approximately 90 degrees to each other, wherein the second tubing connector includes a second apparatus handle extending substantially perpendicularly to the second tubing connector and comprises three other tubular sections at approximately 90 degrees to each other.

10. An apparatus according to claim 9 wherein one tubular section from the three tubular sections is encased with a first swivel handle, wherein a second tubular section from the three other tubular sections is encased with a second swivel handle.

11. An apparatus according to claim 1 wherein the first tubing connector is attached to the first substantially vertical member via a first socket section, wherein the second tubing connector is attached to the second substantially vertical member via a second socket connection.

12. An apparatus according to claim 11 wherein the first socket section and the second socket section comprise a pinhole.

13. An apparatus according to claim 12 wherein a pin is provided to slide into the pinhole.

14. An apparatus according to claim 1 wherein the first substantially vertical member and the second substantially vertical member comprise pinholes to allow for adjustment of the height of the thruster bar.

15. An apparatus according to claim 3 wherein the second substantially horizontal member has at one end opposite the first substantially vertical member a first strap retaining bar to allow connection of a first side of the adjustable strap, wherein the third substantially horizontal member has at one end opposite the second substantially vertical member a second strap retaining bar to allow connection of a second side of the adjustable strap.

16. An apparatus according to claim 15 wherein a strap retaining collar is provided to prevent the adjustable strap from sliding off.

17. An apparatus according to claim 15 wherein the first side of the adjustable strap is wrapped around the first strap retaining bar and the second side of the adjustable strap is wrapped around the second strap retaining bar.

* * * * *